(12) United States Patent
Wang et al.

(10) Patent No.: US 10,649,268 B2
(45) Date of Patent: May 12, 2020

(54) DISPLAY PANEL AND DISPLAY DEVICE

(71) Applicants: BOE Technology Group Co., Ltd., Beijing (CN); Chongqing BOE Optoelectronics Technology Co., Ltd., Chongqing (CN)

(72) Inventors: Jingyu Wang, Beijing (CN); Jungho Park, Beijing (CN)

(73) Assignees: BOE Technology Group Co., Ltd., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/092,311

(22) PCT Filed: Feb. 9, 2018

(86) PCT No.: PCT/CN2018/076015
§ 371 (c)(1),
(2) Date: Oct. 9, 2018

(87) PCT Pub. No.: WO2018/157725
PCT Pub. Date: Sep. 7, 2018

(65) Prior Publication Data
US 2019/0146249 A1    May 16, 2019

(30) Foreign Application Priority Data
Mar. 3, 2017    (CN) .................... 2017 2 0206950 U

(51) Int. Cl.
*G02F 1/1335*    (2006.01)
*G02F 1/1337*    (2006.01)
(Continued)

(52) U.S. Cl.
CPC .......... *G02F 1/1335* (2013.01); *G02F 1/1333* (2013.01); *G02F 1/1337* (2013.01);
(Continued)

(58) Field of Classification Search
None
See application file for complete search history.

(56) References Cited

U.S. PATENT DOCUMENTS 5,777,713 A * 7/1998 Kimura ............... G02F 1/13394
349/156
6,124,917 A * 9/2000 Fujioka ................. G02F 1/1339
349/153
(Continued)

FOREIGN PATENT DOCUMENTS

CN   102402070 A   4/2012
CN   103033994 A   4/2013
(Continued)

OTHER PUBLICATIONS

International Search Report for PCT/CN2018/076015 dated May 14, 2018.

*Primary Examiner* — Ryan Crockett
(74) *Attorney, Agent, or Firm* — Arent Fox LLP; Michael Fainberg

(57) ABSTRACT

A display panel and a display device, comprising: an opposed substrate and an array substrate opposite to the opposed substrate, as well as a liquid crystal layer provided between the opposed substrate and the array substrate, and recess structures which are provided in at least one of the opposed substrate and the array substrate and provided at the side facing the liquid crystal layer. The display panel has a display region, a non-visual region surrounding the display region, and a sealant region surrounding the non-visual region. The recess structures are provided at corners of the non-visual region.

10 Claims, 4 Drawing Sheets

(51) Int. Cl.
*G02F 1/1333* (2006.01)
*G02F 1/1339* (2006.01)
*G02F 1/1341* (2006.01)

(52) U.S. Cl.
CPC .......... *G02F 1/1339* (2013.01); *G02F 1/1341* (2013.01); *G02F 1/133345* (2013.01); *G02F 2001/133388* (2013.01)

(56) References Cited

U.S. PATENT DOCUMENTS

| | | | |
|---|---|---|---|
| 6,456,346 B1 | 9/2002 | Arai | |
| 7,088,418 B1* | 8/2006 | Yamashita | G02F 1/13394 349/153 |
| 8,334,963 B2* | 12/2012 | Yoshida | G02F 1/1339 349/153 |
| 9,391,296 B2* | 7/2016 | Park | H01L 51/5253 |
| 2003/0117570 A1* | 6/2003 | Kim | G02F 1/13394 349/153 |
| 2007/0177092 A1* | 8/2007 | Hosoya | G02F 1/1345 349/149 |
| 2010/0149477 A1* | 6/2010 | Nagami | G02F 1/1339 349/138 |
| 2013/0141688 A1* | 6/2013 | Wang | G02F 1/133711 349/158 |
| 2015/0036094 A1* | 2/2015 | Lee | G02F 1/1333 349/158 |
| 2015/0062515 A1* | 3/2015 | Tomioka | G02F 1/133788 349/123 |
| 2015/0301370 A1* | 10/2015 | Moriwaki | G02F 1/1339 349/42 |
| 2015/0346556 A1* | 12/2015 | Hirota | G02F 1/1339 349/43 |
| 2016/0091743 A1* | 3/2016 | Yu | G02F 1/1339 349/42 |
| 2018/0196290 A1* | 7/2018 | Li | G02F 1/1339 |

FOREIGN PATENT DOCUMENTS

| | | |
|---|---|---|
| CN | 105093692 A | 11/2015 |
| CN | 106154652 A | 11/2016 |
| CN | 206479739 U | 9/2017 |

* cited by examiner

DISPLAY PANEL AND DISPLAY DEVICE

This application is a National Stage of International Application No. PCT/CN2018/076015, filed Feb. 9, 2018, which claims the priority of Chinese Patent Application No. 201720206950.9, filed with the Chinese Patent Office on Mar. 3, 2017, and entitled "Display panel and display device", which is hereby incorporated by reference in its entirety.

FIELD

This disclosure relates to the field of display technologies, and particularly to a display panel and a display device.

BACKGROUND

Liquid Crystal Displays (LCDs) have become widely favored, and predominant among the existing displays due to their low power consumption, high quality of image, small volume, low weight, and other characteristics. The existing liquid crystal displays generally include Thin Film Transistor (TFT) liquid crystal display panels, and they generally include an opposite substrate and a TFT array substrate arranged opposite to each other, and a liquid crystal layer arranged between the two substrates.

The existing liquid crystal display panel is fabricated in such a way that liquid crystals are filled into the space between the opposite substrate and the array substrate by filling the liquid crystals drip by drip onto the surfaces of the substrate, and then aligning the opposite substrate with the array substrate so that the liquid crystals are diffused and filled into an area surrounded by sealant.

SUMMARY

An embodiment of this disclosure provides a display panel. The display includes: an opposite substrate, an array substrate arranged opposite to the opposite substrate, a liquid crystal layer arranged between the opposite substrate and the array substrate, and recessed parts arranged on a side of at least one of the opposite substrate and the array substrate facing the liquid crystal layer, wherein the display panel has a display area, an invisible area surrounding the display area, and a sealant area surrounding the invisible area, and the recessed parts are arranged at corners of the invisible area.

In some embodiment of this disclosure, in the display panel above according to the embodiment of this disclosure, the display panel further includes: a target layer arranged on a side of the opposite substrate facing the liquid crystal layer; and the target layer is arranged with the recessed parts, and a thickness of the target layer in an area where the recessed parts are located is less than a thickness of the target layer in the other area.

In some embodiment of this disclosure, in the display panel above according to the embodiment of this disclosure, a positive projection of an opening of each of the recessed parts onto the display panel covers a positive projection of a bottom of each of the recessed parts onto the display panel.

In some embodiment of this disclosure, in the display panel above according to the embodiment of this disclosure, a side of each of the recessed parts facing the display area extends to the display area in a linearly-climbing manner in a direction from the bottom of said recessed part to the opening thereof.

In some embodiment of this disclosure, in the display panel above according to the embodiment of this disclosure, a side of each of the recessed parts facing the display area extends to the display area in a stepping manner in a direction from the bottom of said recessed part to the opening thereof.

In some embodiment of this disclosure, in the display panel above according to the embodiment of this disclosure, the recessed parts run through the target layer in a direction perpendicular to the display panel.

In some embodiment of this disclosure, in the display panel above according to the embodiment of this disclosure, the target layer arranged on the opposite substrate includes a planarization layer.

In some embodiment of this disclosure, in the display panel above according to the embodiment of this disclosure, the target layer arranged on the array substrate includes one or more of a planarization layer, a passivation layer, or a gate insulation layer.

In some embodiment of this disclosure, in the display panel above according to the embodiment of this disclosure, the display panel further includes: at least one circle of wall part arranged in the invisible area and surrounding the display area, and each circle of wall part includes a plurality of sub-walls spaced from each other; and the recessed parts are located on a side of the wall part facing the sealant area.

In some embodiment of this disclosure, in the display panel above according to the embodiment of this disclosure, the display panel is provided with a plurality of circles of wall parts, and a gap between two adjacent sub-walls in each circle of wall part is arranged opposite to a sub-wall in an adjacent circle of wall part.

In some embodiment of this disclosure, in the display panel above according to the embodiment of this disclosure, patterns of sections of the recessed parts parallel to the display panel are triangles, rectangles, or circulars.

Correspondingly an embodiment of this disclosure further provides a display device including the display panel above.

DETAILED DESCRIPTION

Figure 1:
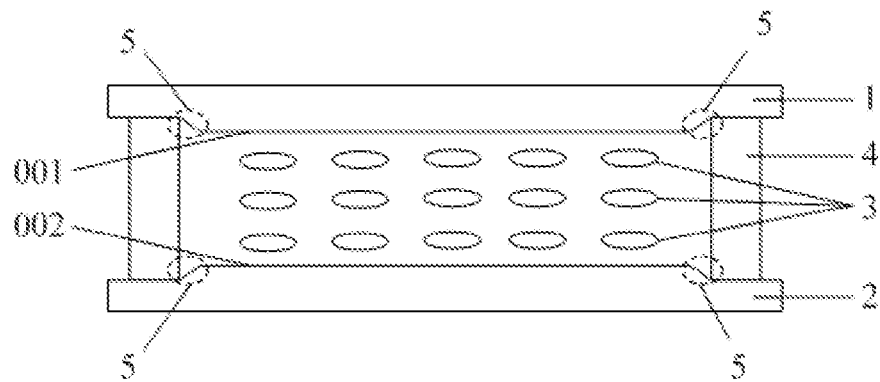
FIG. 1 is a schematic sectional view of a display panel according to an embodiment of the disclosure.

Implementations of the embodiments of this disclosure will be described below in details with reference to the drawings. It shall be noted that same or similar reference numerals throughout the specification refer to same or similar elements, or elements with same or similar functions. The embodiments to be described with reference to the drawings are illustrative, and only intended to illustrate this disclosure, but not to limit the disclosure thereto. The embodiments of the disclosure, and the features in the embodiments can be combined with each other unless they conflict with each other.

The sizes and shapes of respective components in the drawings are not intended to reflect any real proportion of a display panel or a display device, but only intended to illustrate the disclosure.

Figure 2:
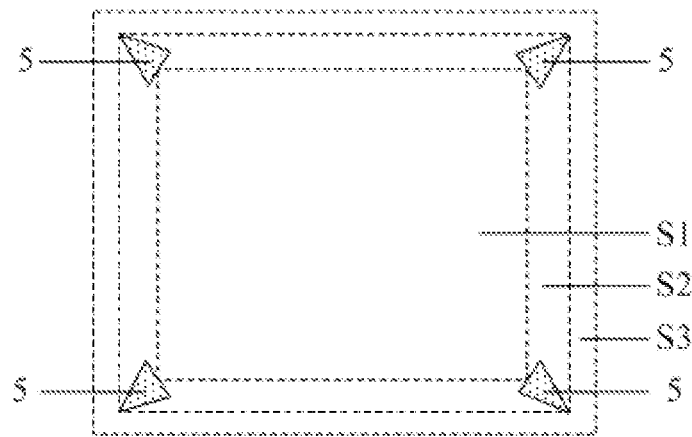
FIG. 2 is a schematic top view of the display panel according to the embodiment of the disclosure.

Referring to FIG. 1 and FIG. 2, an embodiment of this disclosure provides a display panel. The display panel includes: an opposite substrate 1, an array substrate 2 arranged opposite to the opposite substrate 1, a liquid crystal layer 3 arranged between the opposite substrate 1 and the array substrate 2, and recessed parts 5 arranged on the side of at least one of the opposite substrate 1 and the array substrate 2 facing the liquid crystal layer 3. Furthermore the display panel has a display area S1, an invisible area S2 surrounding the display area S1, and a sealant area S3 surrounding the invisible area S2, where the recessed parts 5 are arranged at corners of the invisible area S2. An image is displayed in the display area S1, and the sealant 4 is arranged in the sealant area S3.

In the display panel according to the embodiment of this disclosure, the recessed parts are arranged on the side of at least one of the opposite substrate and the array substrate facing the liquid crystal layer, at the corners of the invisible area, so that liquid crystals can be diffused at the corners in a larger space while the opposite substrate is being aligned with the array substrate, thus making it easier for the liquid crystals to be diffused at the corners of the display panel, so as to lower the probability of poor displaying on the display panel due to that the liquid crystals were not diffused to the corners thereof.

It shall be noted that the display panel according to the embodiment of this disclosure is a display panel with corners. As illustrated in FIG. 2, for example, the display area S1 of the display panel is a quadrangle, and for example, common display panels having a quadrangle display area can be a display screen of a computer, a display screen of a mobile phone, a flat panel display screen, etc. Furthermore the invisible area S2 in the embodiment of this disclosure can refer to any area between the display area S1 and the sealant area S3, that is, generally the display area S1 of the display panel is located at the center of the display panel, and the sealant area S3 is located in an outer bezel area of the display panel, where the display area S1 is not in direct contact with the sealant area S3, but spaced by the invisible area S2 from the sealant area S3. Furthermore in order to enable the liquid crystals to cover the display area S1 sufficiently, the invisible area S2 is typically covered with the liquid crystals, and the sealant 4 seals and covers the liquid crystals in the display area S1 and the invisible area S2. Since the display area S1 is generally a quadrangle, the invisible area S2 surrounding the display area S1 is a quadrate frame area with corners, so when the recessed parts 5 are arranged at the corners of the invisible area S2, the liquid crystals can be easily diffused at the corners to thereby avoid the poor displaying of the display panel due to bubbles formed at the corners thereof where the liquid crystals are not diffused.

Generally a plurality of layers are arranged on the opposite substrate and the array substrate, and in the embodiment of this disclosure, as illustrated in FIG. 1, the opposite substrate 1 has a first surface 001 facing the liquid crystal layer 3, where the first surface 001 can refer to the surface of the opposite substrate 1 arranged with the layers. The array substrate 2 has a second surface 002 facing the liquid crystal layer 3, where the second surface 002 can refer to the surface of the array substrate 2 arranged with the layers. In a specific implementation, as illustrated in FIG. 1, in the display panel above according to the embodiment of this disclosure, the recessed parts 5 can be arranged at the corners of the invisible area S2 on the first surface 001 of the opposite substrate 1, or the recessed parts 5 can be arranged at the corners of the invisible area S2 on the second surface 002 of the array substrate 2, so that it may be easier for the liquid crystals to be diffused at the corners of the display panel while the opposite substrate 1 is being aligned with the array substrate 2, so as to lower the probability of poor displaying of the display panel due to that the liquid crystals were not diffused at the corners thereof.

Furthermore as illustrated in FIG. 1, the recessed parts 5 are arranged at the corners of the invisible area S2 of both the first surface 001 of the opposite substrate 1 and the second surface 002 of the array substrate 2, so that it may be easier for the liquid crystals to be diffused at the corners of the display panel while the opposite substrate 1 is being aligned with the array substrate 2, so as to lower the probability of poor displaying of the display panel due to that the liquid crystals were not diffused at the corners thereof. In a specific implementation, the recessed parts can be arranged accordingly as needed in a real application environment, although the embodiment of this disclosure will not be limited thereto.

Figure 3:
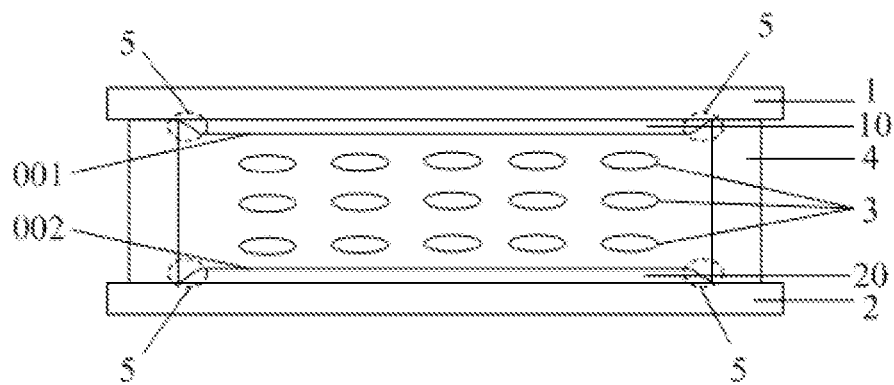
FIG. 3 is a schematic structural view of recessed parts arranged at a target layer of the display panel according to an embodiment of the disclosure.

The recessed parts arranged on the opposite substrate can be formed by removing the respective layers of thin films at the corners of the invisible area on the opposite substrate, or removing some layer at the corners of the invisible area on the opposite substrate. In a specific implementation, as illustrated in FIG. 3, the display panel can further include: a target layer arranged on the side of the opposite substrate 1 facing the liquid crystal layer 3, where the target layer includes the recessed parts 5, and the thickness of the target layer in the area where the recessed parts 5 are located is less than the thickness of the target layer in the other area. Throughout the following description, a first layer 10 represents the target layer arranged on the side of the opposite substrate 1 facing the liquid crystal layer 3, that is, the opposite substrate 1 is arranged with the first layer 10 on the side thereof facing the liquid crystal layer 3, so that the recessed parts can be formed by making the thickness of the first layer 10 at the corners of the invisible area S2 less than the thickness thereof in the other area. In a specific implementation, the first layer 10 can be the outermost layer arranged on the side of the opposite substrate 1 facing the liquid crystal layer 3, that is, the first layer 10 is the closest layer arranged on the opposite substrate 1 to the liquid crystal layer 3; or the first layer 10 can be one or more of the plurality of layers arranged on the side of the opposite substrate 1 facing the liquid crystal layer 3, that is, the film is thinned at the corners of the invisible area S2, so that when the other layers are arranged sequentially on that layer, the same layer is generally formed with the same thickness, so that the recessed parts 5 can be formed at the corners of the invisible area as a result. Specifically, for example, such a thin film at a planarization layer on the opposite substrate 1 that lies at the corners of the invisible area S2 can be removed. In a real application, an alignment layer (not illustrated) is further arranged on the side of the planarization layer facing the liquid crystal layer, but since generally the planarization layer on the opposite substrate is thicker, and the alignment layer is thinner, the thickness of the alignment layer can be neglected, so that when the thin film at the planarization layer at the corners of the invisible area is removed to form the recesses parts, the recessed parts can be formed with a significant depth to thereby make it easier for the liquid crystals to be diffused at the corners.

The recessed parts arranged on the array substrate can be formed by removing the respective layers of thin films at the corners of the invisible area on the array substrate, or removing some layer at the corners of the invisible area on the array substrate. In a specific implementation, as illustrated in FIG. 3, the display panel can further include: a target layer arranged on the side of the array substrate 2 facing the liquid crystal layer 3, where the target layer includes the recessed parts 5, and the thickness of the target layer in the area where the recessed parts 5 are located is less than the thickness of the target layer in the other area. Throughout the following description, a second layer 20 represents the target layer arranged on the side of the array substrate 2 facing the liquid crystal layer 3, that is, the array substrate 2 is arranged with the second layer 20 on the side thereof facing the liquid crystal layer 3, so that the recessed parts can be formed by making the thickness of the second layer 20 at the corners of the invisible area S2 less than the thickness thereof in the other area. In a specific implementation, the second layer 20 can be the outermost layer arranged on the side of the array substrate 2 facing the liquid crystal layer 3, that is, the second layer 20 is the closest layer arranged on the array substrate 2 to the liquid crystal layer 3; or the second layer 20 can be one or more of the plurality of layers arranged on the side of the array substrate 2 facing the liquid crystal layer 3, that is, the film is thinned at the corners of the invisible area S2, so that when the other layers are arranged sequentially on that layer, the same layer is generally formed with the same thickness, so that the recessed parts 5 can be formed at the corners of the invisible area as a result. Specifically, for example, such a thin film at one or more of a planarization layer, a passivation layer, and a gate insulation layer on the array substrate 2 that lies at the corners of the invisible area S2 can be removed. In a real application, an alignment layer (not illustrated) is further arranged on the side of the planarization layer facing the liquid crystal layer, but since generally the planarization layer or the passivation layer on the array substrate is thicker, and the alignment layer is thinner, the thickness of the alignment layer can be neglected, so that when the thin film at the planarization layer or the passivation layer at the corners of the invisible area is removed to form the recessed parts, the recessed parts can be formed with a significant depth to thereby make it easier for the liquid crystals to be diffused at the corners. In a real application, a color filter layer for displaying in colors can be arranged on the opposite substrate, or can be arranged on the array substrate, although the embodiment of this disclosure will not be limited thereto.

Figure 4:
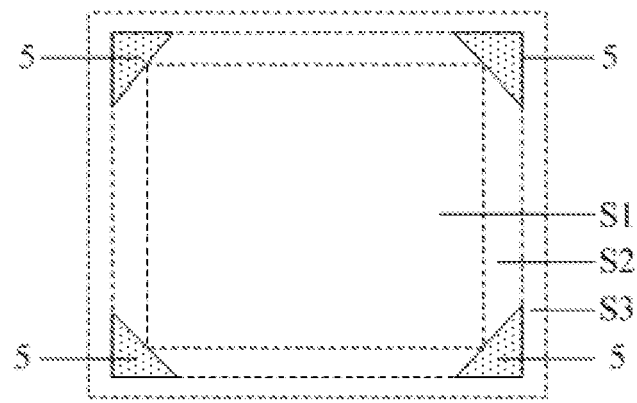
FIG. 4 is a top view of recesses parts according to the embodiment of the disclosure.

In a specific implementation, the recessed parts 5 can be arranged centrally at the corners of the invisible area S2. As illustrated in FIG. 2, for example, respective inside surfaces of the recessed parts can be consisted of a sidewall of the target layer. Of course, the recessed parts 5 can alternatively be arranged on the edges of the corners of the invisible area S2. As illustrated in FIG. 4, for example, the recessed parts 5 are consisted of a sidewall of the target layer and the sealant. In a real application, the structure of the recessed parts can be set flexibly in a specific implementation, although the embodiment of this disclosure will not be limited thereto.

Figure 5:
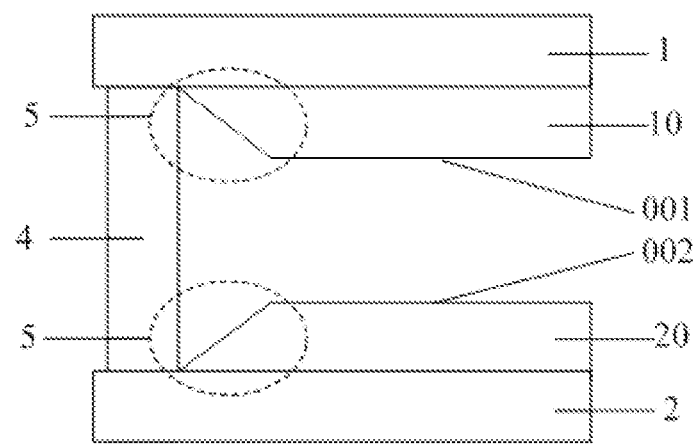
FIG. 5 is a first schematic enlarged view of the recessed parts at corners according to the embodiment of the disclosure.
Figure 6:
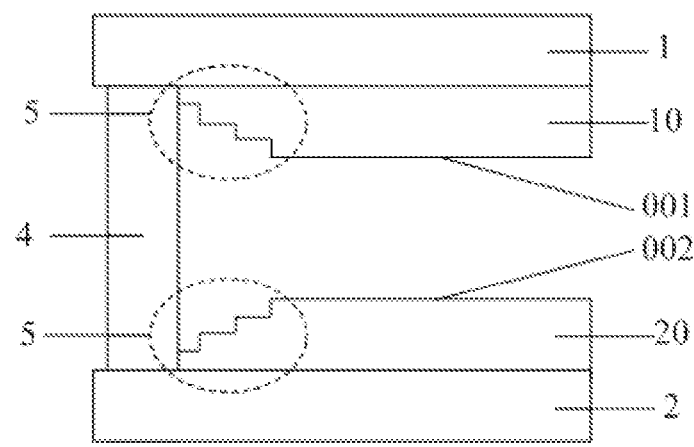
FIG. 6 is a second schematic enlarged view of the recessed parts at corners according to the embodiment of the disclosure.

Furthermore in order to make it easier for the liquid crystals to be diffused into the recessed parts 5 at the corners of the invisible area, and make it less difficult for the liquid crystals to be diffused to the bottoms of the recessed parts, in a specific implementation, as illustrated in FIG. 5 and FIG. 6 (where FIG. 5 is a schematic enlarged view of the display panel at the corners, and FIG. 6 is another schematic enlarged view of the display panel at the corners), positive projections of openings of the recessed parts 5 onto the display panel can cover positive projections of the bottoms of the recessed parts 5 onto the display panel so that the area of an opening of each recessed part can be larger than the area of the bottom thereof to thereby facilitate diffusion of the liquid crystals.

In a specific implementation, the liquid crystals can flow along the inside surface of a recessed part with a first slope, and as illustrated in FIG. 5, the side of the recessed part 5 facing the display area S1 can extend to the display area S1 in a linearly-climbing manner in the direction from the bottom of the recessed part 5 to the opening thereof. Specifically taking a recessed part 5 arranged on the opposite substrate 1 as an example, the inside surface of the recessed part 5 on the opposite substrate 1 can be a plane inclined at a preset angle from the first surface 001, and extend from the bottom of the recessed part 5 to the opening thereof. Alike a recessed part 5 can be arranged on the array substrate 2, so a repeated description thereof will be omitted here.

In a specific implementation, as illustrated in FIG. 6, the side of a recessed part 5 facing the display area S1 can extend to the display area S1 in a stepping manner in the direction from the bottom of the recessed part 5 to the opening thereof. Specifically taking a recessed part 5 arranged on the opposite substrate 1 as an example, the inside surface of the recessed part 5 on the opposite substrate 1 can be in the form of a step, and extend from the bottom of the recessed part 5 to the opening thereof. Alike a recessed part 5 can be arranged on the array substrate 2, so a repeated description thereof will be omitted here.

Figure 7:
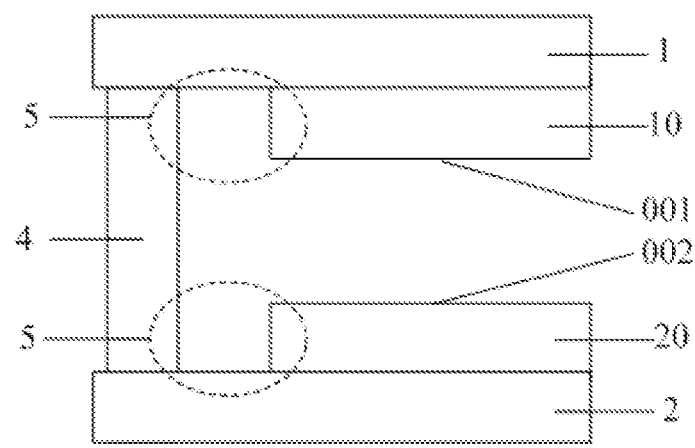
FIG. 7 is a third schematic enlarged view of the recessed parts at corners according to the embodiment of the disclosure.

In a specific implementation, the recessed parts 5 can run through the target layer in the direction perpendicular to the display panel as illustrated in FIG. 7. Specifically taking the recessed parts 5 arranged on the opposite substrate 1 as an example, the recessed parts 5 can be via-holes. Alike the recessed parts 5 can be arranged on the array substrate 2, so a repeated description thereof will be omitted here.

The shape of a recessed part can be a triangular pyramid, so that as illustrated in FIG. 2 and FIG. 4, the pattern of a section of the recessed part 5 parallel to the display panel, i.e., the pattern of a section thereof parallel to the first surface, can be a triangle. In a specific implementation, the shape of a recessed part can be a rectangular pyramid, so the pattern of a section thereof parallel to the first surface can be a rectangle. Of course, the shape of a recessed part can alternatively be a cylinder, so the pattern of a section thereof parallel to the first surface can be a circular.

Figure 8:
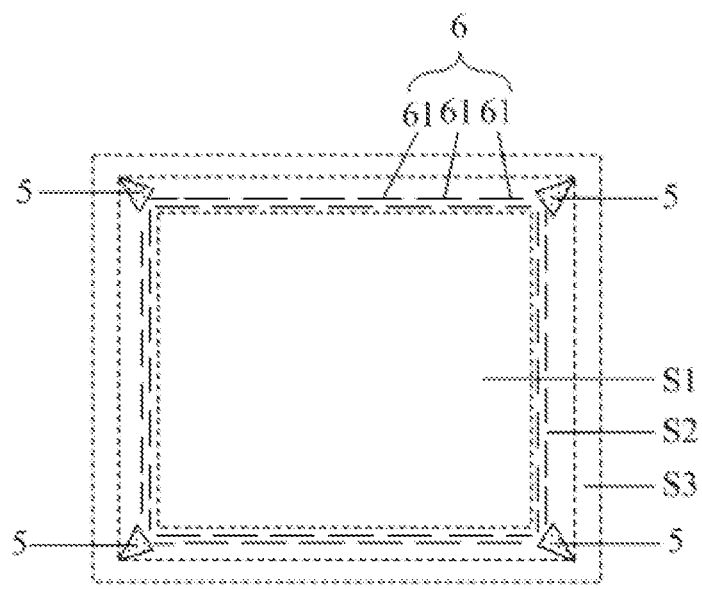
FIG. 8 is a schematic view of the display panel arranged with wall parts according to an embodiment of the disclosure.

In order to prevent the liquid crystals from being diffused prematurely into the sealant area S3, and thus contacting with the sealant, so that the liquid crystals may be contaminated with the sealant, in a specific implementation of the embodiment of this disclosure as illustrated in FIG. 8 (only two circles of wall parts are illustrated), at least one circle of wall part 6 surrounding the display area is further arranged in the invisible area S2 of the display panel, and each circle of wall part 6 includes a plurality of sub-walls 61 spaced from each other. The recessed parts 5 are located on the side of the wall part 6 facing the sealant area S3. In a specific implementation, there may be one, two, three, etc., circles of wall parts, and the specific number of circles shall be determined as needed in a real application environment, although the embodiment of the disclosure will not be limited thereto.

In a specific implementation, in order to further prevent the liquid crystals from being diffused prematurely into the sealant area S3, and thus contacting with the sealant, as illustrated in FIG. 8, a plurality of circles of wall parts 6 are arranged in the invisible area S2 of the display panel, and a gap between two adjacent sub-walls 61 in each circle of wall part 6 is arranged opposite to a sub-wall 61 in an adjacent circle of wall part 6, so that the capacity of the circle of wall part 6 to block the liquid crystals from being diffused can be further improved.

In a specific implementation, the gap between two adjacent sub-walls in each circle of wall part ranges from 1 μm to 10 μm. Specifically the gap between two adjacent sub-walls in the same circle of wall part can be 1 μm, or the gap between two adjacent sub-walls in the same circle of wall part can be 10 μm. In a real application, the size of the gap can be determined as needed in a real application environment, although the embodiment of the disclosure will not be limited thereto.

The spacing between the wall part and the display area can be more than 0.4 mm due to a variation in a process of fabricating the alignment layer. Of course, in a real application, the spacing between the wall part and the display area can be 0.41 mm, 0.42 mm, etc., and the size thereof can be determined as needed in a real application environment, although the embodiment of the disclosure will not be limited thereto.

An embodiment of this disclosure further provides a display device including the display panel according to the above embodiment of this disclosure.

In summary, in the display panel and the display device according to the embodiments of this disclosure, the recessed parts are arranged on the side of at least one of the opposite substrate and the array substrate facing the liquid crystal layer, at the corners of the invisible area, so that liquid crystals can be diffused at the corners in a larger space while the opposite substrate is being aligned with the array substrate, thus making it easier for the liquid crystals to be diffused at the corners of the display panel, so as to lower the probability of poor displaying of the display panel due to that the liquid crystals were not diffused at the corners thereof.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display panel, comprising:
   an opposite substrate;
   an array substrate arranged opposite to the opposite substrate;
   a liquid crystal layer arranged between the opposite substrate and the array substrate;
   recessed parts arranged on a side of at least one of the opposite substrate and the array substrate facing the liquid crystal layer;
   a display area, an invisible area surrounding the display area, and a sealant area surrounding the invisible area; and
   a plurality of circles of wall parts arranged in the invisible area and surrounding the display area, wherein each circle of the plurality of circles of wall parts comprises a plurality of sub-walls spaced apart from each other, wherein a gap between two adjacent sub-walls in each circle of the plurality of circles of wall parts is arranged opposite to a sub-wall in an adjacent circle of wall part, and wherein the gap between two adjacent sub-walls in each circle of the plurality of circles of wall parts ranges from about 1 μm to about 10 μm;
   wherein the recessed parts are located between the wall parts and the sealant area, and the recessed parts arranged at corners of the invisible area, and a portion of the recessed parts close to the sealant area is lower than a portion of the recessed parts close to the wall parts.

2. The display panel according to claim 1, wherein the display panel further comprises: a target layer arranged on a side of the opposite substrate facing the liquid crystal layer; and
   the target layer is arranged with the recessed parts, and a thickness of the target layer in an area where the recessed parts are located is less than a thickness of the target layer in the other area.

3. The display panel according to claim 2, wherein a positive projection of an opening of each of the recessed parts onto the display panel covers a positive projection of a bottom of each of the recessed parts onto the display panel.

4. The display panel according to claim 3, wherein a side of each of the recessed parts facing the display area extends to the display area in a linearly-climbing manner in a direction from the bottom of said recessed part to the opening thereof.

5. The display panel according to claim 3, wherein a side of each of the recessed parts facing the display area extends to the display area in a stepping manner in a direction from the bottom of said recessed part to the opening thereof.

6. The display panel according to claim 3, wherein the recessed parts run through the target layer in a direction perpendicular to the display panel.

7. The display panel according to claim 2, wherein the target layer arranged on the opposite substrate comprises a planarization layer.

8. The display panel according to claim 2, wherein the target layer arranged on the array substrate comprises one or more of a planarization layer, a passivation layer, or a gate insulation layer.

9. The display panel according to claim 1, wherein patterns of sections of the recessed parts parallel to the display panel are triangles, rectangles, or circulars.

10. A display device, comprising the display panel according to claim 1.

* * * * *